Aug. 20, 1968     J. B. JACOBSEN ET AL     3,398,023
SIGHT GLASS CLEANING
Filed Jan. 21, 1964
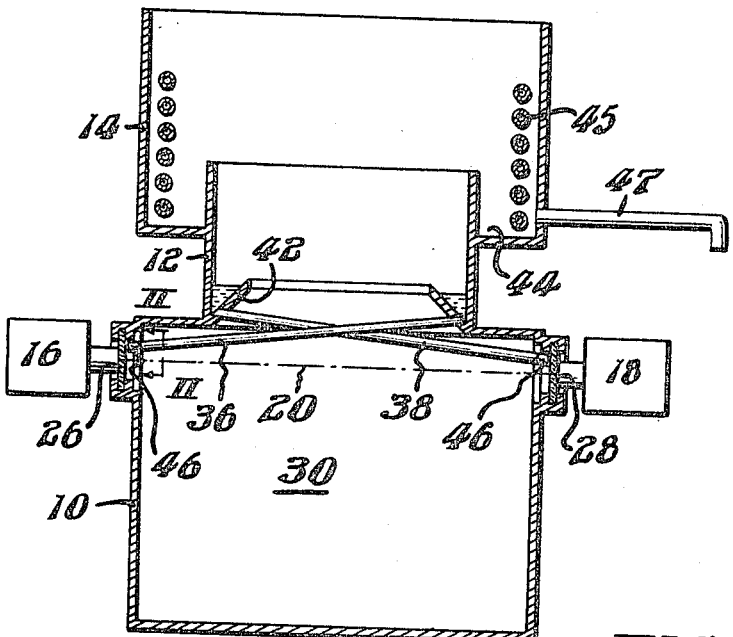
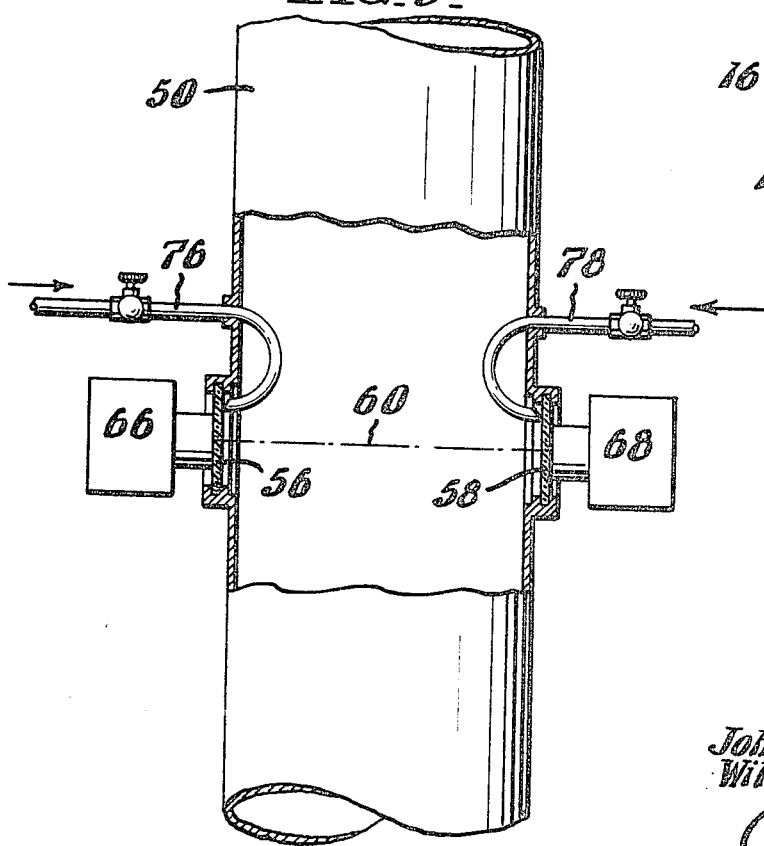
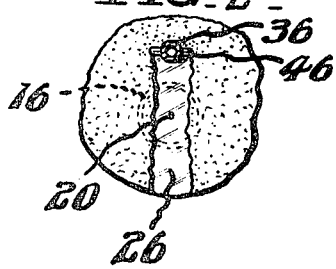
INVENTORS.
John B. Jacobsen &
William R. Carpenter,
Paul & Paul
ATTORNEYS.

United States Patent Office 3,398,023
Patented Aug. 20, 1968

3,398,023
SIGHT GLASS CLEANING
John B. Jacobsen and William R. Carpenter, Bowling Green, Ky., assignors to Detrex Chemical Industries, Inc., Detroit, Mich., a corporation of Michigan
Filed Jan. 21, 1964, Ser. No. 339,255
2 Claims. (Cl. 134—22)

This invention relates to a method for maintaining clean and free of contamination the interior surface of a sight glass, or the surface of selected portions of the interior wall of a vessel. Ordinarily at least, the interior surfaces to be kept clean are inaccessible for manual cleaning due to the conditions or actions taking place inside the vessel.

The object of the present invention is to provide a method for performing such cleaning automatically.

In the construction of vessels, such as boilers, stills, smokestacks, vent lines, processing containers and the like, it is customary to insert into the wall of the vessel one or more sight glasses or other sections which are transparent or translucent to light rays or to some other form of energy radiation. In the most common form, such inserts are made of transparent glass or plastic and are ordinarily referred to as sight glasses or portholes since their purpose is to permit a view of events or conditions inside the vessel for the purpose of controlling the same, either manually or automatically.

One example of the use of sight glasses to control automatically a condition within a vessel is found in U.S. Patent 3,011,956, issued Dec. 5, 1961, to J. C. Smith et al., and assigned to the assignee of the present application. In that patent a system for control of an automatic dry cleaning still is shown, described and claimed. In the control system of the patent, two sight glasses are installed in opposed positions, one each on opposite side walls of the still, and a beam of light is projected from a light source located outside of and on one side of the still through the near sight glass, across the interior of the still, out the far sight glass and is received by a photosensitive cell located outside of and on the opposite side of the still. The photo-cell senses any change taking place in the interior of the still which alters the conductance of the light beam therethrough. In the specific situation described in the said Patent 3,011,956, the purpose is to prevent foam generated in the still from rising into the condensate chamber located above the still. When the foam rises sufficiently to intercept the light beam, the light received by the photosensitive cell is diminished, and this decrease in light is sensed and used to generate an electrical signal which operates an electrically operated valve to shut off the steam heat to the still. With removal of the steam heat supply, the foam subsides. As soon as the foam drops sufficiently so that it no longer intercepts the light from the light source, the increase in light is sensed by the photo-cell and the electrical signal generated operates the valve to again turn on the steam heat to the still. The foam then again rises, the beam of light is again intercepted, and the steam heat is again shut off. The action just described is rapid and results in steam heat being supplied to the still in a pulsating manner but with such rapidity as to provide almost continuous distillation. While the rate of distillation is thus maintained high, the foam blanket is nevertheless prevented, by the control means just described, from rising sufficiently to reach and contaminate the condensate collected in a condensing chamber located above the still.

The automatic system described in U.S. Patent 3,011,956, and briefly summarized above, employs a visible light beam. Visible light, however, is but one form of energy radiation which may be used for the purpose of controlling automatically a condition within a vessel. Another useful form of radiation, for a similar purpose, is invisible infra-red radiation. Such rays may be generated by a hot surface and the radiation received by an infrared detecting device after having passed through a portion of the vessel. Such a system is in commercial use to analyze and control gas mixtures, since in many commonly used gas mixtures the thermal conductivity of the gas mixture is related directly to its composition.

Another form of radiation which may be used for the purpose of controlling conditions within a closed vessel, is nuclear radiation. In one application, nuclear radiation is used to measure the level of chlorine in a chlorine receiving vessel. In this application, a source of nuclear radiation is attached to the exterior wall of the vessel. The source is unshielded in the direction of the vessel wall so that radiation may pass through the near wall of the vessel, through the interior of the vessel, thence out the opposite wall of the vessel to one or more nuclear radiation counters or receivers. When the level of liquid chlorine in the vessel rises sufficiently to interpose liquid in the path between the radiation source and the receiver, less radiation reaches the receiver and thus indicates the liquid level. In this application, the normal vessel walls pass the nuclear radiation, and no sight glasses or other special inserts are necessary.

Still another form of energy which may be used for the purpose is ultra-sonic energy. For example, ultra-sonic energy has been used to detect internal flaws in an object immersed in an oil bath. In such application, the source and detector of the ultra-sonic radiation may be the same transducer device, or the source and detector may be separate transducer devices. Where the source and detector are the same transducer device, the detection of the flaws is accomplished by reflection of energy from the flaw. Where the source and detector are separate devices, detection of the flaw is accomplished by sensing the attenuation of the energy due to the flaw.

It is clear from the above examples, that the passage of radiation in one form or another through a vessel is a known and useful method of measurement and control. In most instances, the radiation is generated outside of the vessel and on one side thereof, and is received by a sensing device which is located outside of the vessel on the opposite side thereof. To allow passage of the radiation through the vessel, a portion of the vessel walls must be transparent, or at least translucent, to the particular form of radiation selected. In the case of nuclear radiation, the ordinary vessel wall may exhibit the required transparency. In most instances, however, a special insert or sight glass is required to be inserted in the vessel wall.

In the description which follows, it will be convenient to illustrate an installation in which a sight glass insert is involved. It is to be understood, however, that the present invention contemplates means for maintaining an interior surface of a vessel clear and clean irrespective of whether or not a sight glass is employed. Where no sight glass is used, the interior normal wall of the vessel is kept clean and free of contamination at the particular areas through which the radiation is passed.

In systems of the type referred to above, the vessel walls and the sight glasses inserted therein tend to progressively collect soil and other contamination on their interior surfaces. Such contamination decreases or otherwise alters the light waves (or other radiation) passing through the sight glasses (or other wall surface) and thus alters the radiation received at the radiation detector. The accuracy of the measurement is accordingly affected. In some applications, this may result in a completely erroneous control. Maintaining the exterior surface of the sight glass clean presents no problem, since the surface is normally readily accessible. However, the interior surface of the sight glass is not ordinarily accessible, at least not during operation of the vessel, and interior surface contamination of the sight glass tends to present a maintenance problem of serious proportions, forcing frequent shut-down.

As has already been indicated, the object of the present invention is to provide a method for maintaining automatically a clean interior surface on the sight glass (or other surface) in a vessel such as a boiler, still, smokestack, vent line, processing tank, and the like through which light wave energy or other radiant energy is passed, and which if not kept clean and free of contamination would modify the light wave or other radiant energy and tend to cause erroneous readings or other erroneous indications.

The foregoing object is accomplished, according to the present invention, by providing means for automatically flushing, either substantially continuously, or at a selected duty cycle, the interior surface of the sight glass, porthole, or other device, with a relatively clean fluid, which may be either a liquid or a gas. The particular liquid or gas chosen for performing the flushing function, the flushing duty cycle, and the means for applying the flushing fluid, is dependent upon the particular vessel, the degree of expected surface contamination, and the process taking place within the vessel.

In the drawing:

FIG. 1 is a diagrammatic elevational representation, partly in section, of means for flushing contamination from the interior surface of oppositely disposed sight glasses by the use of distillate obtained from the processing vessel itself;

FIG. 2 is a view in section along the line II–II of FIG. 1; and

FIG. 3 is a diagrammatic elevational representation, partly in section, depicting the introduction, into the interior of the stack or other vessel at the location of the opposite disposed sight glasses, of jets of compatible liquids or gases having a source outside the stack, pipe or other vessel.

Referring now to FIG. 1, there is shown a still body 10 having an uninsulated duct or throat 12 leading to a condenser housing 14 mounted above the still body. The still may be assumed to be of the type shown and described in U.S. Patent 3,011,956 and may be assumed to be used for the same purpose, namely, to distill a liquid mixture of the type typically encountered in a dry cleaning solvent system. Such a liquid mixture may contain perchlorethylene, coupling agents, moisture and soluble contaminants, and very small insoluble particles. In the distillation of such a mixture to recover the perchlorethylene, considerable foaming is encountered which, if the heat input to the still 10 is not controlled, will increase in depth until the foam column enters the throat 12 and he housing 14 of the condensate collector. Since such a foam blanket or layer contains fatty acids and other distillation residues, such foam in the condensate collecting area will contaminate the perchlorethylene returned to the system supply to an unacceptable degree.

The problem was to find a way of operating the still at a high distillation rate without allowing the foam to contaminate the condensate. This problem was solved in U.S. Patent 3,011,956 by the use of a light beam and a photo-sensitive cell to detect when the light beam was intercepted by the foam. The electrical signal developed by the photo-cell was then used to shut off the heat supply to the still, but only until the foam subsided below the light beam at which time the heat supply was restored. This form of control caused the application of heat to the still at a rapid pulsation rate and resulted in a high rate of distillation without allowing the foam to enter the condensate collecting areas.

In FIG. 1, a light source 16 and a photo-sensitive cell 18 are shown mounted in opposed positions outside the wall of the still body 10. The light beam 20 from the source 16 passes into the chamber 30 of the still through the glass window of porthole 26 and leaves the chamber through the glass window of portholes 28. The elements 16, 18, 26 and 28 are so mounted that the beam 20 is at the height to which the foam generated in chamber 30 may permissibly rise.

In the practice of the automatic control system described in U.S. Patent 3,011,956 and summarized above, each time the foam blanket rises to the light beam level it contacts the interior surface of the glass of the portholes 26 and 28, and as a result thereof a deposit of silt or dirt collects on the interior face of the porthole which diminishes the amount of light reaching the photo-cell 18. Ultimately, the deposit becomes great enough to block the light from reaching the photo-cell 18 in sufficient amount to develop the signal to open the valve to reestablish the heat supply after the foam has subsided below the light beam level. When this happens, it is necessary to remove manually the residue from the porthole surface.

We have discovered that the interior surfaces of the porthole glass may be kept adequately clean and free of residue by merely causing a small portion of the condensate itself to flow down over the glass of the portholes. This is accomplished by installing the pipes 36 and 38 to direct the condensate which collects in the drip trough 42 of the duct or throat 12 to each of the portholes 26 and 28. The major portion of the condensate is collected in the trough 44 of the condenser housing in the vicinity of the condensing coil 45 and is conducted by piping 47 back to the solvent supply by way of a water separator (not shown).

We have found that by directing the condensate from trough 42 to the portholes (rather than returning it to the solvent source) the glass of the portholes is sufficiently washed or flushed to overcome the objectionable build-up of residue referred to previously above. In order to obtain the desired width for the wash or flush, the discharge end of the pipes 36 and 38 are flattened and spread to form a relatively wide slit or mouth, as depicted by the mouth 46 in FIG. 2. The mouths of the pipes 36 and 38 are, of course, disposed above the level of the light beam 20 so that the condensate discharged from the pipes may flow down over the surface through which the beam passes.

The discovery that the collection of objectionable residue on the porthole glass may be avoided by the simple expedient of directing to the glass surface that portion of the condensate which is collected in the drip trough 42 is a discovery which has several important advantages. In the first place, the fluid used for the flush is fully compatible with the action taking place within the still. Secondly, the supply is self controlled. Thirdly, it avoids the installation of more expensive wiping equipment, such as of the windshield wiper type.

FIG. 3 represents a pipe or stack 50 through which gases or liquids may flow monitored by the beam 60 projected by the source 66 and received by the receiver 68. To maintain the interior surfaces of the glass of portholes 56 and 58 clean and free of residue, fluid (either liquid or gas) from an outside source is piped into the stack 50, as by pipes 76 and 78, and directed downwardly across the porthole glass. The flushing fluid used should, of course, be compatible with the action taking place within the vessel.

While the preferred embodiments of this invention have been described in some detail, it will be obvious to one skilled in the art that various modifications may be made without departing from the invention as hereinafter claimed.

In the claims which follow the term "wave energy" includes visual light, infrared, ultraviolet, electromagnetic, sound, ultrasonic energy and nuclear radiation.

Having just described our invention, we claim:

1. In the operation of a vessel through which wave energy is passed for inspection or control purposes, said energy passing through the planes of the walls at opposed locations, the method of maintaining the interior surfaces of the wall planes at the energy passage points clean and free of residue, said method comprising directing a supply of compatible cleaning fluid to the interior surfaces of the wall planes at the energy passage points for interposing said clean compatible fluid between the vessel wall and the normal contents of the vessel.

2. The method claimed in claim 1 characterized in that the compatible cleaning fluid is self-generated within the vessel as a product of the action taking place therein.

References Cited

UNITED STATES PATENTS

| | | | |
|---|---|---|---|
| 1,303,186 | 5/1919 | Erickson | 134—166 |
| 1,655,859 | 1/1928 | Engbrecht | 134—113 |
| 2,460,425 | 2/1949 | Mace | 134—113 |
| 2,680,084 | 6/1954 | Ryan | 134—105 |
| 2,714,079 | 7/1955 | Stodgell | 134—22 |
| 2,726,180 | 12/1955 | Stankey | 134—22 |
| 2,771,892 | 11/1956 | St. Pally | 134—113 |
| 3,001,533 | 9/1961 | Holdren | 134—166 |
| 3,067,069 | 12/1962 | Stack | 134—22 |
| 3,185,661 | 5/1965 | Hubby | 134—22 |
| 3,232,482 | 2/1966 | Stock et al. | 134—102 |

MORRIS O. WOLK, *Primary Examiner.*

J. ZATARGA, *Assistant Examiner.*